(12) United States Patent
Claus et al.

(10) Patent No.: US 10,814,530 B2
(45) Date of Patent: Oct. 27, 2020

(54) MOLD DEVICE FOR A ROTATIONAL MOLDING DEVICE

(71) Applicant: PLASTIGI, Noorderwijk (BE)

(72) Inventors: Filip Claus, Noorderwijk (BE); Stefan Claus, Noorderwijk (BE)

(73) Assignee: PLASTIGI, Noorderwijk (BE)

( * ) Notice: Subject to any disclaimer, the term of this patent is extended or adjusted under 35 U.S.C. 154(b) by 23 days.

(21) Appl. No.: 16/340,358

(22) PCT Filed: Oct. 12, 2017

(86) PCT No.: PCT/EP2017/076090
§ 371 (c)(1),
(2) Date: Apr. 8, 2019

(87) PCT Pub. No.: WO2018/069459
PCT Pub. Date: Apr. 19, 2018

(65) Prior Publication Data
US 2019/0240879 A1    Aug. 8, 2019

(30) Foreign Application Priority Data

Oct. 12, 2016   (WO) .................. PCT/EP2016/074447

(51) Int. Cl.
*B29C 41/04*       (2006.01)
*B29C 41/46*       (2006.01)
(Continued)

(52) U.S. Cl.
CPC .......... *B29C 41/46* (2013.01); *B29C 33/0011* (2013.01); *B29C 33/02* (2013.01); *B29C 41/04* (2013.01); *B29C 41/06* (2013.01)

(58) Field of Classification Search
CPC ....... B29C 33/02; B29C 41/04; B29C 41/042; B29C 41/06; B29C 41/46
See application file for complete search history.

(56) References Cited

U.S. PATENT DOCUMENTS 3,173,175 A    3/1965  Lemelson
3,734,665 A *  5/1973  Guillaud ................. B29C 33/06
                                                          425/174
(Continued)

FOREIGN PATENT DOCUMENTS

CN    103264473 A    8/2013
EP    1 837 148 A2   9/2007
(Continued)

OTHER PUBLICATIONS

International Search Report dated Jan. 10, 2018, issued in corresponding International Application No. PCT/EP2017/076090, filed Oct. 12, 2017, 3 pages.

*Primary Examiner* — James P Mackey
(74) *Attorney, Agent, or Firm* — Christensen O'Connor Johnson Kindness PLLC

(57) ABSTRACT

A mold device configured for use in a rotational molding device configured to perform a rotational molding process by rotating the mold device by means of a robot arm is provided. The mold device generally includes a connector part for connecting to the robot arm, first and second mold parts configured to assemble to each other for enclosing a mold cavity in an assembled state. The mold device includes a magnet gripper for releasably attaching the mold parts and heating and cooling elements integrated in at least one of the mold parts for respectively heating and cooling the mold part. The heating elements may be arranged in first grooves positioned in an exterior face of the respective mold part. The cooling elements may be arranged in second grooves positioned in the exterior face of the respective mold part in between the first grooves.

20 Claims, 11 Drawing Sheets

(51) Int. Cl.
    *B29C 33/00*     (2006.01)
    *B29C 33/02*     (2006.01)
    *B29C 41/06*     (2006.01)

(56) References Cited

U.S. PATENT DOCUMENTS

| | | | |
|---|---|---|---|
| 4,964,943 A | 10/1990 | Krüger et al. | |
| 5,837,183 A * | 11/1998 | Inoue | B29C 33/06 |
| | | | 264/403 |
| 5,989,008 A * | 11/1999 | Wytkin | B29C 33/02 |
| | | | 249/78 |
| 8,658,070 B2 * | 2/2014 | Maziers | B29C 41/042 |
| | | | 264/255 |
| 2007/0221356 A1 * | 9/2007 | Rottigni | B29C 41/46 |
| | | | 164/348 |
| 2008/0261046 A1 | 10/2008 | Husler | |
| 2014/0272256 A1 | 9/2014 | Langheld et al. | |

FOREIGN PATENT DOCUMENTS

| | | |
|---|---|---|
| EP | 2 832 519 A1 | 2/2015 |
| FR | 2 736 860 A1 | 1/1997 |
| WO | 96/14196 A1 | 5/1996 |
| WO | 2013/164765 A2 | 11/2013 |
| WO | 2015/193616 A1 | 12/2015 |

\* cited by examiner

MOLD DEVICE FOR A ROTATIONAL MOLDING DEVICE

TECHNICAL FIELD

The present invention relates to a mould device for use in a rotational moulding device wherein a rotational moulding process is performed by rotating the mould device by means of a robot arm. The present invention also relates to a rotational moulding device comprising the mould device.

BACKGROUND ART

EP1649997A1 discloses a mould for rotational moulding wherein a fluid duct for heated and cold fluids is directly incorporated in the mass of the mould wall. The duct is wound around the mould from a first side to an opposite second side and back.

EP2832519A1 discloses a mould for rotational moulding of hollow objects. The mould comprises a first and a second half-shell of metallic material, coupled to define a cavity having the shape of the object to be moulded. An electrically conductive element is housed in a groove or channel winding around on the outside surface of the half-shells. The electrically conductive element is connected to a high frequency variable electrical power source, so as to generate a magnetic field in the half-shells to heat them by electromagnetic induction. Internally, the electrically conductive element defines a passage for a cooling fluid to cool the half-shells.

DISCLOSURE OF THE INVENTION

It is an aim of the present invention to provide a mould device which does not show at least one of the drawbacks of the prior art.

This aim is achieved according to the invention with a mould showing the technical characteristics of the first independent claim.

It is a further aim of the present invention to provide a mould device which is easy to manufacture, and which is more efficiently heated and cooled.

The invention provides, according to a first aspect, a mould device for use in a rotational moulding device wherein a rotational moulding process is performed by rotating the mould device by means of a robot arm. The mould device comprises a connector part for connecting the mould device to the robot arm of the rotational moulding device. The mould device comprises a first mould part and a second mould part. Optionally, the mould device comprises at least one further mould part. The mould parts are provided for being assembled to each other. The mould parts are provided for enclosing a mould cavity in an assembled state. Each of the mould parts comprises an interior face facing towards the mould cavity. Each of the mould parts comprises an exterior face facing away from the mould cavity. The mould device comprises attachment means for attaching the mould parts in a releasable manner to each other. The mould device comprises heating means integrated on at least one of the mould parts for heating the respective mould part which is manufactured from a thermally conductive material. The mould device comprises cooling means integrated on at least one of the mould parts for cooling the respective mould part which is manufactured from a thermally conductive material. The heating means comprise a plurality of heating elements arranged in a plurality of first grooves. The first grooves are provided in or on the exterior face of the respective mould part. The cooling means comprise a plurality of cooling elements arranged in a plurality of second grooves. The second grooves are provided in or on the exterior face of the respective mould part in between the first grooves.

The use of the first grooves and the second grooves offers the advantage that the mould device according to the present invention may be easier to manufacture. The grooves may, for example, be provided in or on the exterior face of the mould parts when the mould parts are being formed during manufacturing, which is easier than incorporating ducts in the mould parts when the mould parts are being formed during manufacturing. Alternatively, the grooves may also be provided in or on the exterior face of the mould parts after the mould parts have been formed during manufacturing, for example by milling. This gives the additional benefit of having more freedom in the choice of where the grooves, and thereby also the heating elements and the cooling elements, will be located on the exterior surface of the mould parts.

The heating elements being arranged in first grooves and the cooling elements being arranged in second grooves, different from the first grooves, offers the advantage that there may be less interference between the heating of the mould parts and the cooling of the mould parts, since the cooling elements do not need to cool down the heating elements before being able to cool down the mould parts and the heating elements do not need to heat the cooling elements before being able to heat the mould parts. Thereby, the second grooves being located in between the first grooves may allow for a uniform heating and cooling of the entire mould part. This can make the process of heating and cooling the mould parts more efficient.

The use of a separate heating element in each of the first grooves and of a separate cooling element in each of the second grooves offers the advantage that different regions of the mould parts may be heated and cooled in an equal manner, thereby providing a more efficient heating and cooling of the mould parts.

Additionally, the use of separate heating elements and cooling elements also allows certain regions of the mould part to be heated and/or cooled more or less than other regions, if this is, for example, required by the shape of the mould parts to obtain an equal temperature distribution inside the mould cavity enclosed by the mould parts in the assembled state.

In an embodiment of the mould device according to the present invention, the heating elements of the heating means comprise at least one heating resistance wire.

The inventors have found that the use of heating resistance wires enables a quick heating of the mould parts, thereby increasing the efficiency of the heating of the mould parts.

In an embodiment of the mould device according to the present invention, the heating elements further comprise an outer sheath of a woven thermally conductive material surrounding the at least one heating resistance wire.

The outer sheath being woven provides a certain flexibility to the outer sheath, which ensures that the shape of the outer sheath is able to adapt itself to the contours of the first groove in which the heating element is arranged. In this way, there is provided a tight contact between the heating element and the mould part, such that there is an efficient heat transfer between the heating element and the mould part.

This flexibility of the outer sheath also allows the heating elements to be arranged easily in the first grooves, which contributes to the easy manufacturing of the mould device.

In an embodiment of the mould device according to the present invention, the cooling elements of the cooling means comprises a tube for circulating a cooling fluid. Preferably, the cooling fluid is selected from the list consisting of oil, mineral oil, silicone oil and water. More preferably, the cooling fluid is water.

In an embodiment of the mould device according to the present invention, the first grooves have a U-shape in cross section and the heating elements arranged in the first grooves have a D-shape in cross section. Alternatively, or, in combination, the second grooves have a U-shape in cross section and the cooling elements arranged in the second grooves have a D-shape in cross section. Hereby, the U-shape and the D-shape are preferably dimensioned such that the groove and the respective element arranged in the groove closely fit each other when the respective element is arranged in the groove with the curved section of the D-shape facing the curved section of the U-shape of the groove.

The grooves having a U-shape in cross section and the respective elements which are arranged in the grooves having a D-shape in cross section, offers the advantage that there may be a large contact surface between the grooves and the elements arranged in the grooves, which can make the heat transfer between the elements and the grooves more efficient. This can make the process of cooling and heating the mould parts of the mould device more efficient.

In an embodiment of the mould device according to the present invention, the first grooves and the second grooves have substantially the same cross section.

The first grooves and the second grooves having substantially the same cross section, offers the advantage that there do not have to be provided different types of grooves in or on the exterior surface of the mould parts, which can simplify the manufacturing of the mould device.

The first grooves and the second grooves having substantially the same cross section can also offer more flexibility in the choice of the location of the heating elements and the cooling elements on the exterior surface of the mould parts.

In an embodiment of the mould device according to the present invention, the heating elements are arranged at a predetermined depth within the first grooves. Alternatively, or, in combination, the cooling elements are arranged at a predetermined depth within the second grooves.

The heating elements and the cooling elements being arranged at a predetermined depth in respectively the first grooves and the second grooves, positions them more inside the bulk of the mould parts, where they can more effectively distribute heat to the mould part in case of the heating elements, and more effectively remove heat from the mould part in case of the cooling elements. This can make the process of cooling and heating the mould parts of the mould device more efficient.

In an embodiment of the mould device according to the present invention, the mould device further comprises at least one covering element for closing off at least one of the first grooves and the second grooves. Preferably, the covering element comprises a thermally conductive material.

The covering element closing off the groove offers the advantage that the heating element or the cooling element arranged in the groove may be fully enclosed, such that the heat transfer between the element arranged in the groove and the mould part is increased. This can make the process of cooling and heating the mould parts of the mould device more efficient.

Additionally, the covering element offers the benefit of protection of the heating element or cooling element it covers.

In an embodiment of the mould device according to the present invention, the first grooves are formed by recesses in the exterior face of the respective mould part. Alternatively, or, in combination, the second grooves are formed by recesses in the exterior face of the respective mould part.

The grooves being formed by recesses in the exterior face of the mould parts is beneficial for the efficiency of heating and cooling the mould parts, since it positions the heating elements and the cooling elements inside the bulk of the mould parts, where they can more effectively distribute heat to the mould part in case of the heating elements, and more effectively remove heat from the mould part in case of the cooling elements.

In an embodiment of the mould device according to the present invention, the first grooves are provided in protrusions on the exterior face of the respective mould part. Alternatively, or, in combination, the second grooves are provided in protrusions on the exterior face of the respective mould part.

This embodiment is beneficial for light-weight mould devices wherein the mould parts have a thin mould wall which would suffer from a decreased strength when grooves are provided therein. The use of protrusions on the exterior face of the mould parts in which the grooves are provided, can ensure that the strength of the mould parts is not decreased, and can still ensure a good heat transfer between the heating elements and the cooling elements on the one hand and the mould parts on the other hand via the protrusions.

In an embodiment of the mould device according to the present invention, at least one of the first grooves is located near the thickest part of the respective mould part.

This embodiment offers the advantage that at least one heating element of the heating means is located near a position where a large mass of the respective mould part is present, such that an efficient heating of the respective mould part is obtained.

This thickest part of the respective mould part may, for example, be a flange at an edge side of the respective mould part, which is used for connecting the respective mould part to one or more of the other mould parts.

In an embodiment of the mould device according to the present invention, the first grooves and the second grooves are arranged alternatingly on the exterior face of the respective mould part.

The first grooves and the second grooves being arranged alternatingly on the exterior face of the mould parts may allow for a uniform heating and cooling of the entire mould part. This can make the process of heating and cooling the mould parts more efficient.

In an embodiment of the mould device according to the present invention, the first grooves and the second grooves are arranged equidistantly on the exterior face of the respective mould part.

The first grooves and the second grooves being arranged equidistantly on the exterior face of the mould parts may allow for a uniform heating and cooling of the entire mould part. This can make the process of heating and cooling the mould parts more efficient.

In an embodiment of the mould device according to the present invention, the heating elements of the heating means are all connected to a single first connection interface arranged for being connected in a releasable manner to a supply means of a resource required in the process of heating the respective mould part.

The single first connection interface offers the advantage that the mould device can be connected quickly and easily to the supply means of a resource required in the process of heating the respective mould part, and also be disconnected quickly and easily therefrom if needed.

In the case of the heating elements comprising at least one heating resistance wire, this supply means may, for example, be a power supply supplying electrical power as the resource for use in the process of heating the respective mould part.

In an embodiment of the mould device according to the present invention, the first connection interface is integrated in the connector part for connecting the mould device to the robot arm of the rotational moulding device.

Integrating the first connection interface with the connector part for connecting the mould device to the robot arm of the rotational moulding device offers the advantage that the need for a separate connection on the mould device for connecting to the robot arm of the rotational moulding device can be avoided, which separate connection would make the mould device more complicated. Therefore, this integration can make the mould device easier to manufacture.

This is certainly beneficial when the heating means require electricity as the resource for heating, since robot arms are mostly electrically powered, and therefore they are able to supply this resource.

In an embodiment of the mould device according to the present invention, the cooling elements of the cooling means are all connected to a single second connection interface arranged for being connected in a releasable manner to a supply means of a resource required in the process of cooling the respective mould part.

The single second connection interface offers the advantage that the mould device can be connected quickly and easily to the supply means of a resource required in the process of cooling the respective mould part, and also be disconnected quickly and easily therefrom if needed.

In the case of the cooling elements comprising a tube for circulating a cooling fluid, this supply means may, for example, be a pump which pumps a cooling fluid from a reservoir containing the cooling fluid through the tubes, the cooling fluid thereby being the resource for use in the process of cooling the respective mould part.

In an embodiment of the mould device according to the present invention, the second connection interface is arranged opposite of the first connection interface.

Arranging the first connection interface and the second connection interface opposite of each other offers the advantage that the necessary wiring, tubes, etc. for the heating means and the cooling means may be separated from each other as much as possible, which can simplify the design of the mould device, and therefore make it easier to manufacture.

This arrangement can also decrease the possibility of connecting means, such as wires, tubes, etc., connecting to the first connection interface interfering with connecting means connecting to the second connection interface.

In a second aspect, which may be combined with the first aspect described herein, though not necessarily, the attachment means comprise at least one magnet gripper arranged on one of the mould parts. The at least one magnet gripper comprises a permanent magnet which is moveably arranged in a cavity of the at least one magnet gripper. The permanent magnet is moveable in the cavity of the at least one magnet gripper by means of compressed air. Thereby, the permanent magnet is moveable between a first position for attaching to another mould part contacting the at least one magnet gripper and a second position for releasing said another mould part contacting the at least one magnet gripper.

The magnet grippers offer the advantage that the mould parts can be attached strongly to each other, because of the use of the permanent magnet, but may nonetheless be released quickly by displacing the magnet by means of the compressed air. This, for example, in comparison with mechanical means, such as bolts, which take time to remove and slow down the process of moulding.

The use of the permanent magnet further has the advantage that no currents need to be applied to magnetize coils or the like to effect or to maintain a magnetic connection.

The present invention further provides a rotational moulding device comprising a mould device according to an embodiment of the present invention. The rotational moulding device comprises a robot arm configured at least for rotating the mould device during a rotational moulding process.

BRIEF DESCRIPTION OF THE DRAWINGS

The invention will be further elucidated by means of the following description and the appended figures.

MODES FOR CARRYING OUT THE INVENTION

Figure 1:
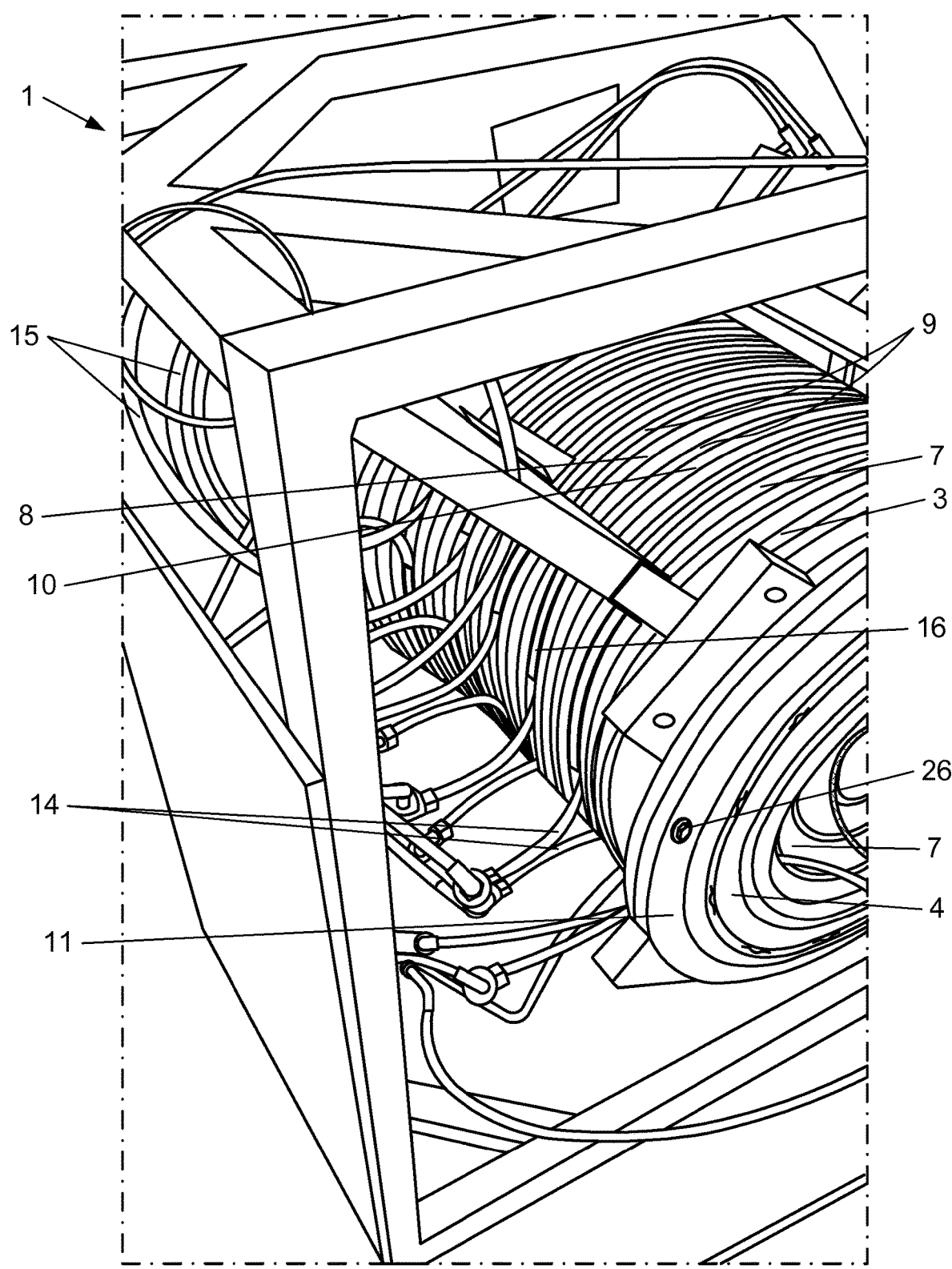
FIG. 1 shows a perspective view on a mould device according to an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 11:
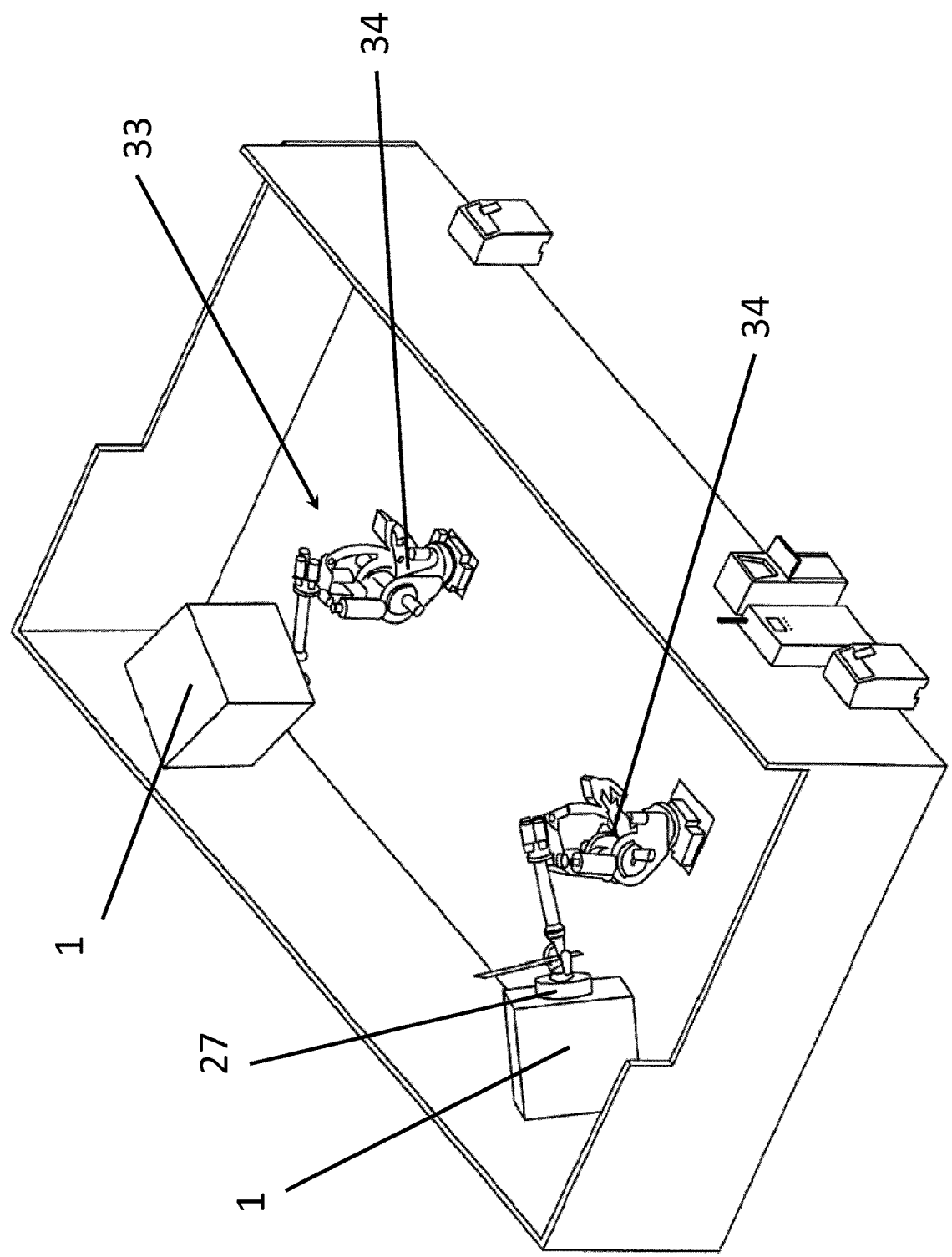
FIG. 11 shows a rotational moulding device according to an embodiment of the present invention.

FIGS. 1-7 show different views on a mould device 1 according to an embodiment of the present invention. The mould device 1 is intended for use in a rotational moulding device 33, such as shown in FIG. 11, wherein the rotational moulding process is performed by rotating the mould device 1 by means of a robot arm 34.

In this embodiment, the mould device 1 comprises a mould having a cylindrical shape. The mould is composed of a first mould part 2, a second mould part 3 and a third mould part 4, wherein the second mould part 3 forms the mantle of the cylinder, and wherein the first mould part 2 and the third mould part 4 each form one of the side faces of the cylinder. The mould parts 2, 3, 4 of the mould device 1 are provided for being assembled to each other. In the assembled state, the mould parts 2, 3, 4 enclose a mould cavity 5. The side 6 of the mould part 2, 3, 4 which faces the mould cavity 5 in the assembled state of the mould parts 2, 3, 4 is referred to as the interior face 6, and the side 7 of the mould part 2, 3, 4 which faces away from the mould cavity 5, and thus towards the exterior of the mould device 1, is referred to as the exterior face 7.

The mould cavity 5, which is enclosed by the mould parts 2, 3, 4 in their assembled state, is used during the process of rotational moulding, for introducing therein a curable raw material 35 for forming an object. After the curable raw material 35 has been introduced into the mould cavity 5, the mould parts 2, 3, 4 are heated directly by means of heating means which are integrated on the mould parts 2, 3, 4. To enable the transfer of the heat of the heating means towards the mould cavity 5, the mould parts 2, 3, 4 are manufactured from a thermally conductive material. The heating of the mould parts 2, 3, 4 causes the curable raw material 35 to melt, after which the mould device 1 is rotated around to disperse the molten curable raw material throughout the mould cavity 5. Thereafter, the mould device 1 is cooled down directly by means of cooling means which are integrated on the mould parts 2, 3, 4. The cooling of the mould device 1 causes the molten curable raw material to cure, thereby forming the object.

The heating means of the mould device comprise a plurality of heating elements 12. The heating elements 12 are arranged in a plurality of first grooves 8 which are provided in or on the exterior face 7 of the mould parts 2, 3, 4. The cooling means of the mould device 1 comprise a plurality of cooling elements 14. The cooling elements 14 are arranged in a plurality of second grooves 9 which are provided in or on the exterior face 7 of the mould parts 2, 3, 4 in between the first grooves 8.

Figure 2:
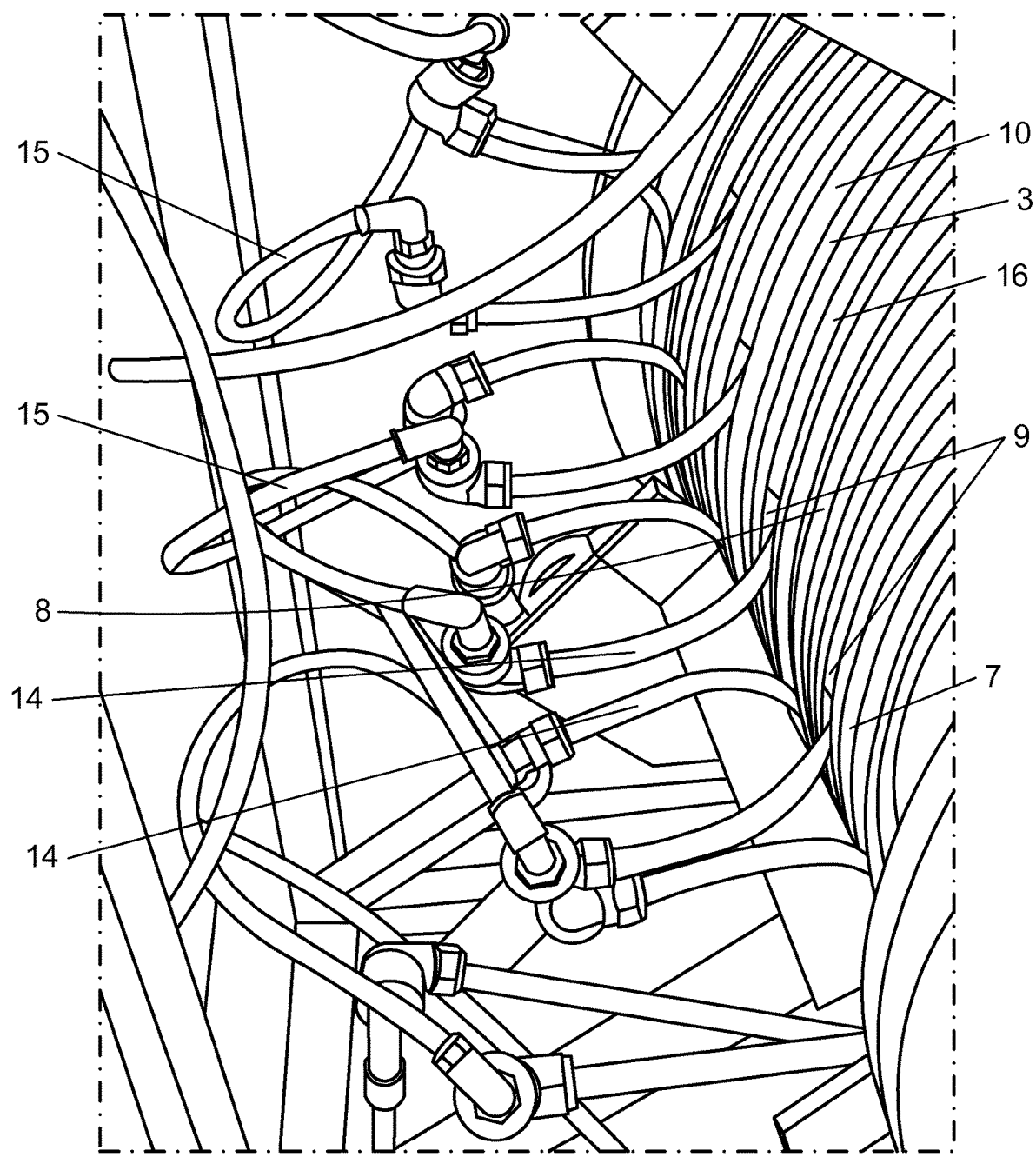
FIG. 2 shows a more detailed perspective view on the mould device of FIG. 1.
Figure 3:
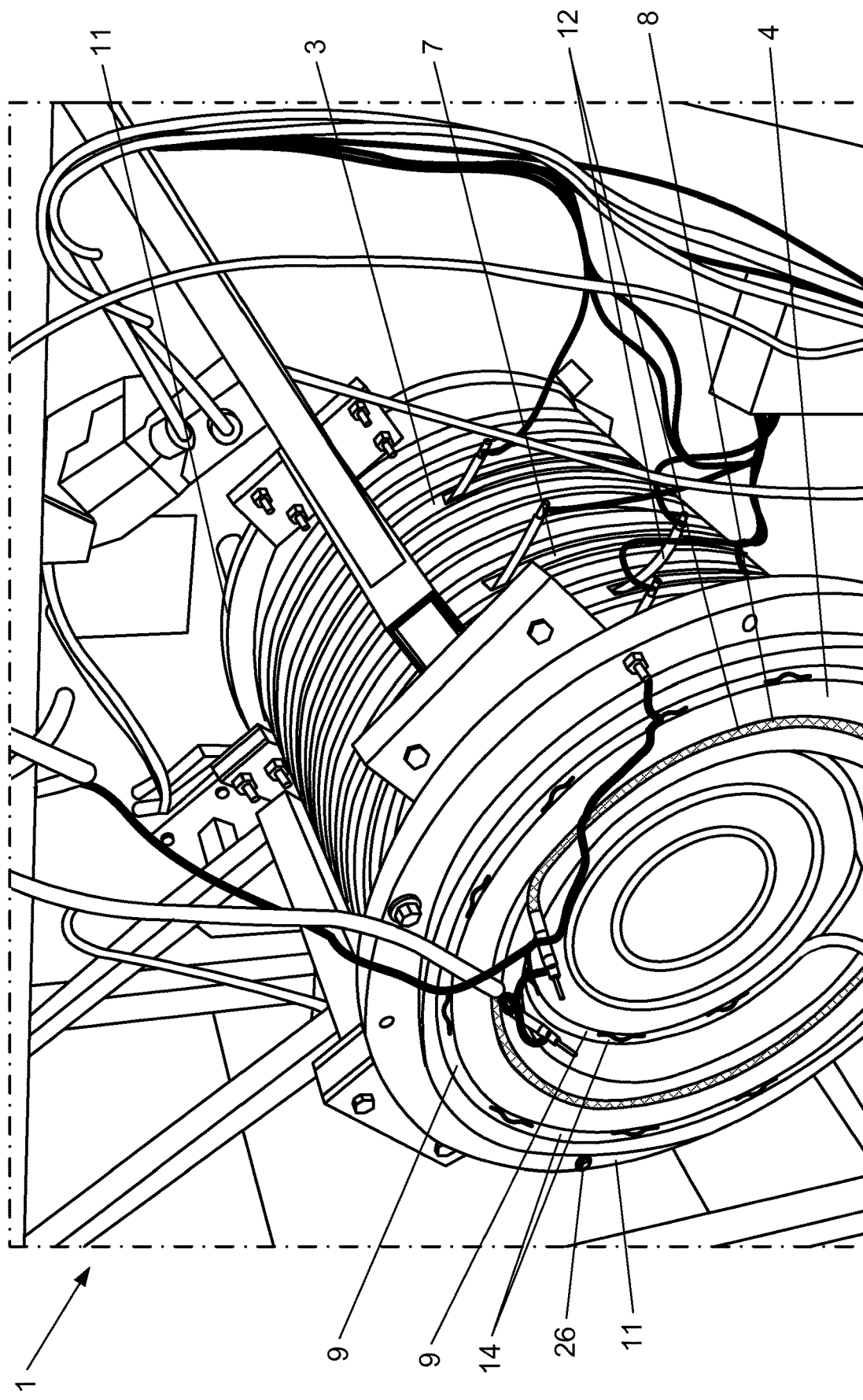
FIG. 3 shows a perspective view on the mould device of FIG. 1 from an opposite side.
Figure 4:
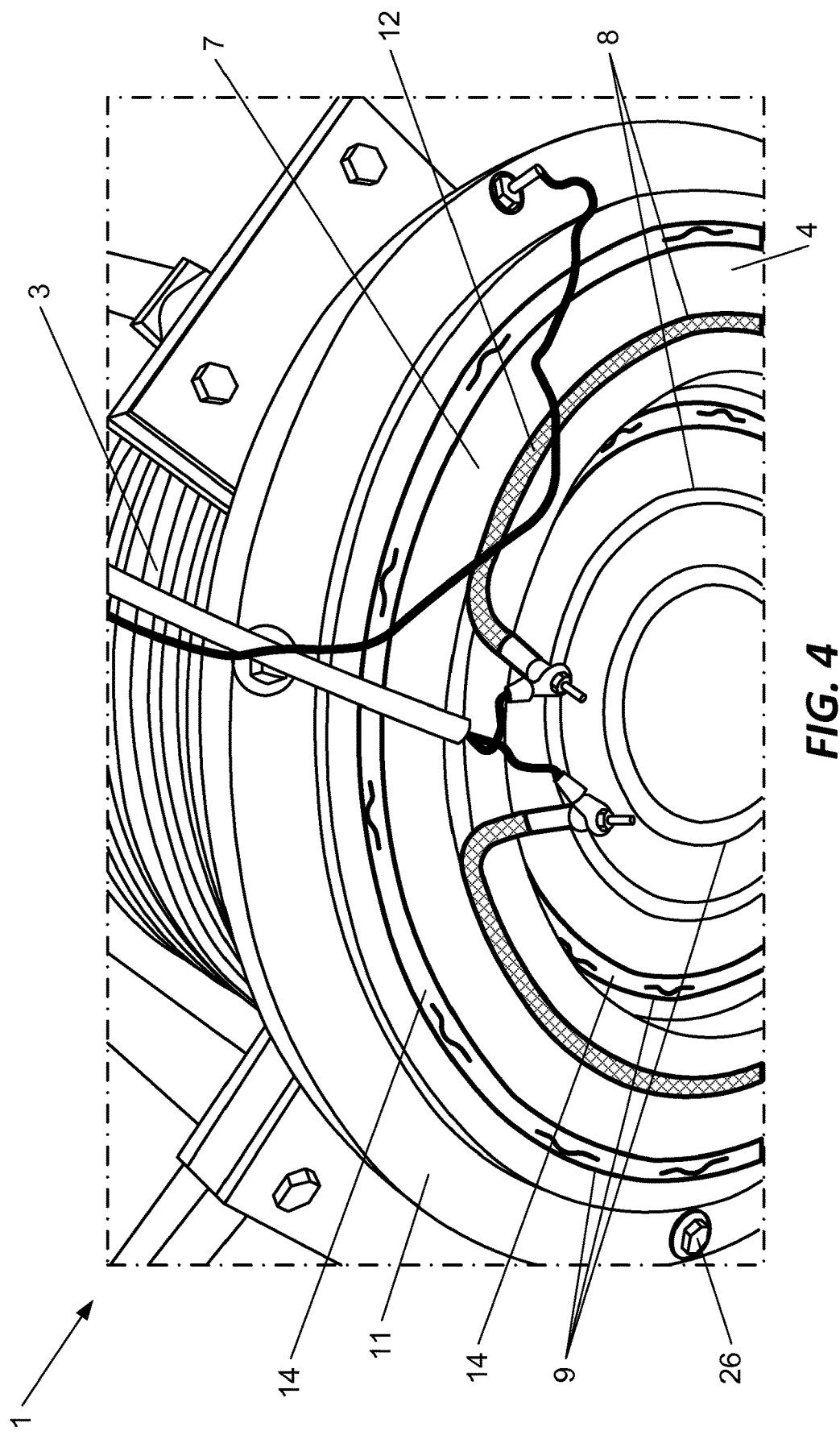
FIG. 4 shows a perspective view on another side of the mould device of FIG. 1.
Figure 6:
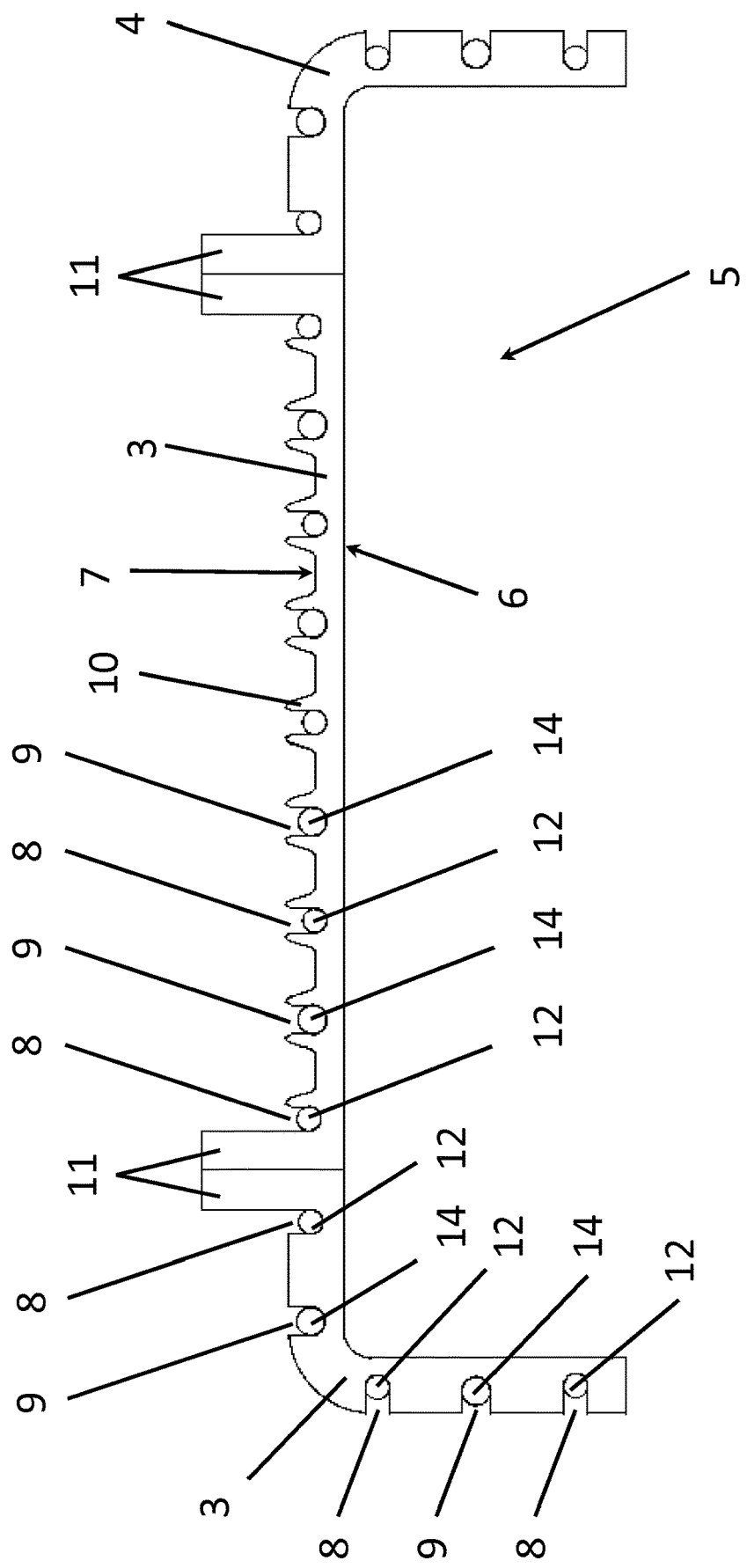
FIG. 6 shows a cross section through a part of the mould parts of the mould device of FIG. 1.

The first grooves 8 and the second grooves 9 of the first mould part 2 and the third mould part 4 are provided in the exterior face 7 of the respective mould part 2, 3, 4, as can be seen in FIGS. 3, 4 and 6. The first grooves 8 and the second grooves 9 of the second mould part 3 are provided in protrusions 10 on the exterior face 7 of the second mould part 3, such as can be seen in FIGS. 1-3 and 6.

The first grooves 8 and the second grooves 9, and thereby also the heating elements 12 and the cooling elements 14 arranged therein, are arranged alternatingly and at equal distances from each other over the entire exterior face 7 of the mould parts 2, 3, 4, such that a uniform heating and cooling of the mould parts 2, 3, 4 and the mould cavity 5 enclosed by the mould parts 2, 3, 4 in their assembled state may be obtained. Thereby, at least one of the first grooves 8 is located closest to one of the flanges 11 of the mould parts 2, 3, 4 where the mould parts 2, 3, 4 are attached to each other in the assembled state. In this embodiment these flanges 11 form the thickest parts of the mould parts 2, 3, 4, and by locating at least one of the first grooves 8, and thus the heating elements 12 arranged therein, closest to them, an efficient heating of the parts of the mould parts 2, 3, 4 having the largest mass may be obtained.

Figure 8:
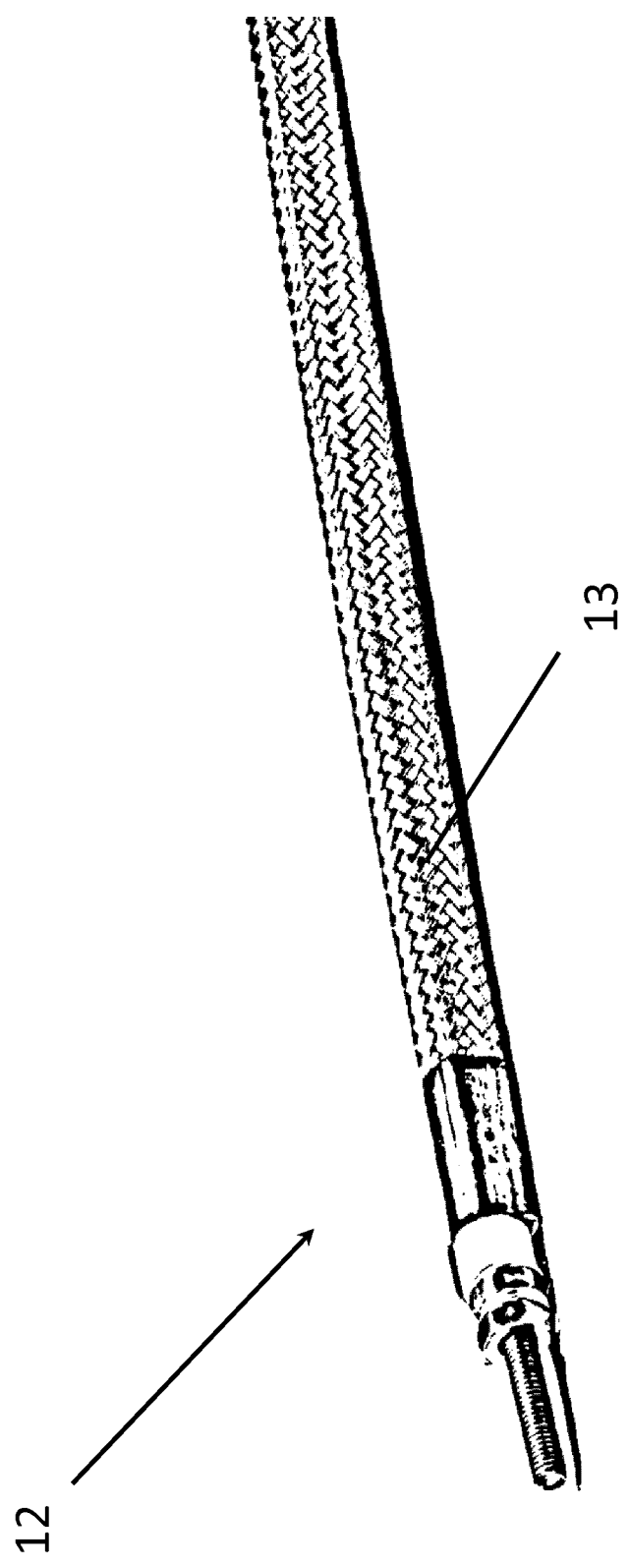
FIG. 8 shows a detailed view of a heating resistance wire of the mould device of FIG. 1.

In this embodiment, the heating elements 12 comprise one or more heating resistance wires 12 which are surrounded by an outer sheath 13 of a woven thermally conductive material, such as shown in FIG. 8. The outer sheath 13 being woven allows the heating element 12 to adapt to the shape of the respective groove 8, 9 in which it is arranged, such that the outer sheath 13 presses itself evenly against the side walls of the respective groove 8, 9. In this way an optimal heat transfer between the heating element 12 and the mould part 2, 3, 4 may be obtained. The thermally conductive material of the outer sheath 13 is preferably a metal, and more preferably nickel. The heating element 12 may, for example, be a GC-Flex® flexible tubular heater of GC Heat®.

In this embodiment, the cooling elements 14 comprise copper tubes 14 for circulating a cooling fluid, such as water or oil.

Figure 7B:
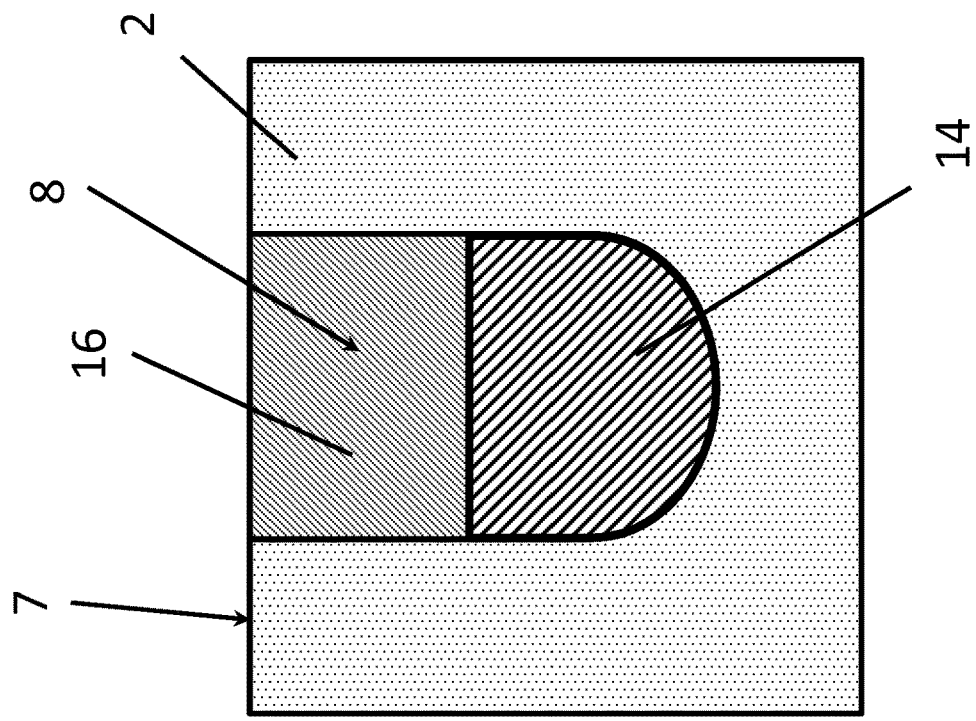
FIG. 7B shows a cross section through a first groove of the mould device of FIG. 6 with a heating element and a covering element arranged therein, but may also represent a cross section through a second groove of the mould device of FIG. 6 with a cooling element and a covering element arranged therein.
Figure 7A:
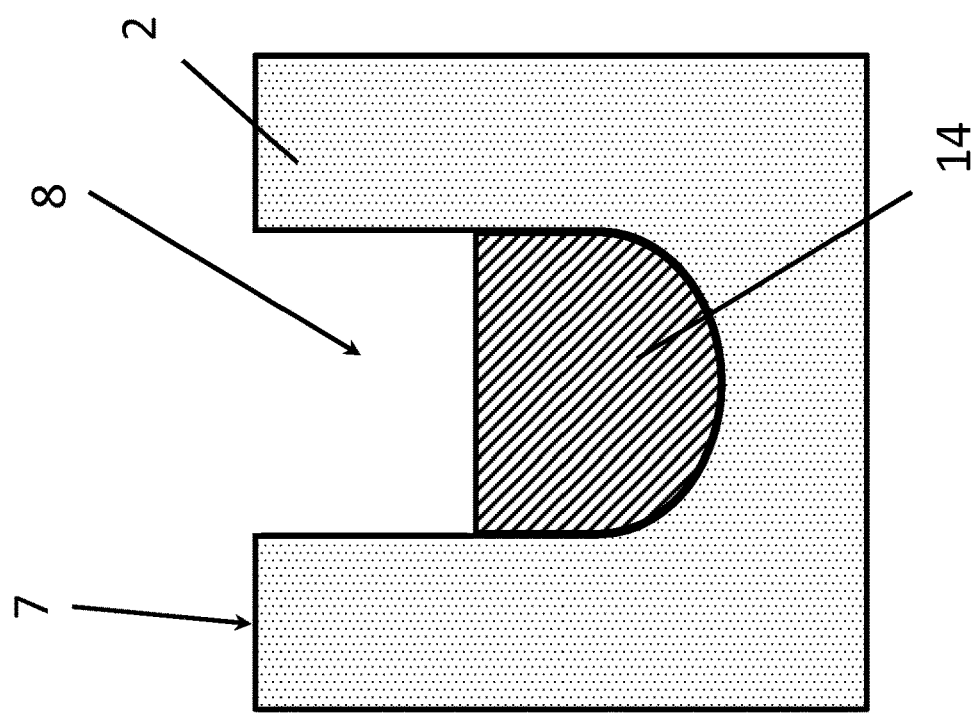
FIG. 7A shows a cross section through a first groove of the mould device of FIG. 6 with a heating element arranged therein, but may also represent a cross section through a second groove of the mould device of FIG. 6 with a cooling element arranged therein.

The first grooves 8 and the second grooves 9 preferably have a U-shape in cross section, and the heating elements 12 and the cooling elements 14 arranged respectively in the first grooves 8 and the second grooves 9 preferably have a D-shape in cross-section, such as shown in FIGS. 7A and 7B. With such shapes, the heating elements 12 and the cooling elements 14 may be arranged respectively in the first grooves 8 and the second grooves 9 with the curved part of the D-shape of the heating element 12 or the cooling element 14 facing the curved part of the U-shape of the respective groove 8, 9 and with the straight part of the D-shape facing towards the opening of the U-shape of the respective groove 8, 9. This enlarges the contact surface between the heating element 12 or the cooling element 14 on the one hand and the mould part 2, 3, 4 on the other hand, for example in comparison with a heating element 12 or a cooling element 14 having a circular cross section, such as shown in FIG. 6, and thus increases the efficiency of the heat transfer between the heating element 12 or the cooling element 14 on the one hand and the mould part 2, 3, 4 on the other hand.

To further increase the efficiency of the heat transfer between the heating elements 12 and the cooling elements 14 on the one hand and the mounting parts 2, 3, 4 on the other hand, the respective grooves 8, 9 in which they are arranged may be closed off by means of covering elements 16, which can be seen in FIGS. 1-3. Such as shown in FIG. 7B, the use of the covering element 16 fully encloses the heating element 12 or the cooling element 14 arranged in the respective groove 8, 9. In case of heating, this may, for example, reduce heat loss through the opening of the first groove 8. In case of cooling, this may, for example, direct the heat of the mould part 2, 3, 4 to the cooling element 14 for a more efficient cooling. Preferably, the covering elements 16 are manufactured from a thermally conductive material, and more preferably from the same thermally conductive material as the mould part 2, 3, 4.

The ends of the heating resistance wires 12 forming the heating elements 12 are arranged as much as possible on one side of the mould device 1, as can be seen in FIG. 3. From there the heating resistance wires 12 are further connected to a single first connection interface (not shown), which is integrated with a connector part 27 of the mould device 1 for connecting the mould device 1 to the robot arm 34 of a rotational moulding device 33, which connector part 27 is for example shown in FIG. 11. This enables a quick and easy connection of the heating resistance wires 12 of the heating means to an electrical power supply via the robot arm 34.

The inlets and the outlets of the copper tubes 14 forming the cooling elements 14 are arranged as much as possible on another side of the mould device 1, opposite of the side of the mould device 1 where the ends of the heating resistance wires 12 are located, as can be seen in FIG. 1. From there the copper tubes 14 are further connected to a single second connection interface (not shown) by means of flexible tubing 15. This enables a quick and easy connection of the cooling means to a source and drain of the cooling fluid.

Figure 5:
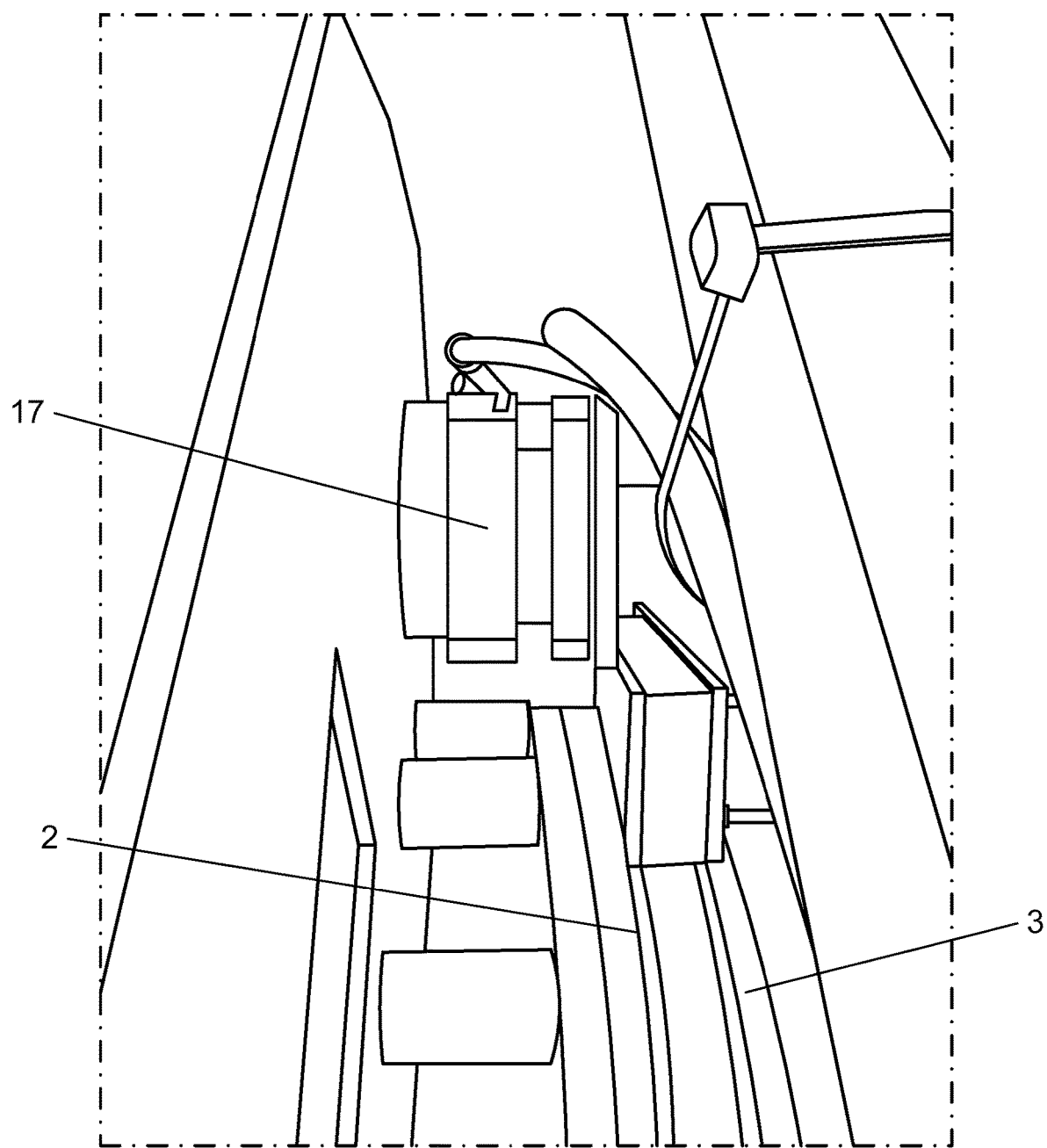
FIG. 5 shows a detailed view of the magnet gripper of the mould device of FIG. 1.

The mould device 1 also comprises attachment means (17, 26) for attaching the mould parts 2, 3, 4 in a releasable manner to each other. In this embodiment magnet grippers 17 are used for attaching the first mould part 2 and the second mould part 3 to each other, such as shown in FIG. 5 and schematically in FIGS. 9A and 9B. For attaching the second mould part 3 and the third mould part 4 to each other, there is made use of bolts 26, such as can be seen in FIGS. 1, 3 and 4.

The magnet grippers 17 are composed of a body 19 which encloses a cavity 22 in which a permanent magnet 18 is arranged. The permanent magnet 18 is moveable in the cavity 22 between a first position wherein it is located at a first side 20 of the body 19 and a second position wherein it is located at a second side 21 of the body 19.

Figure 9A:
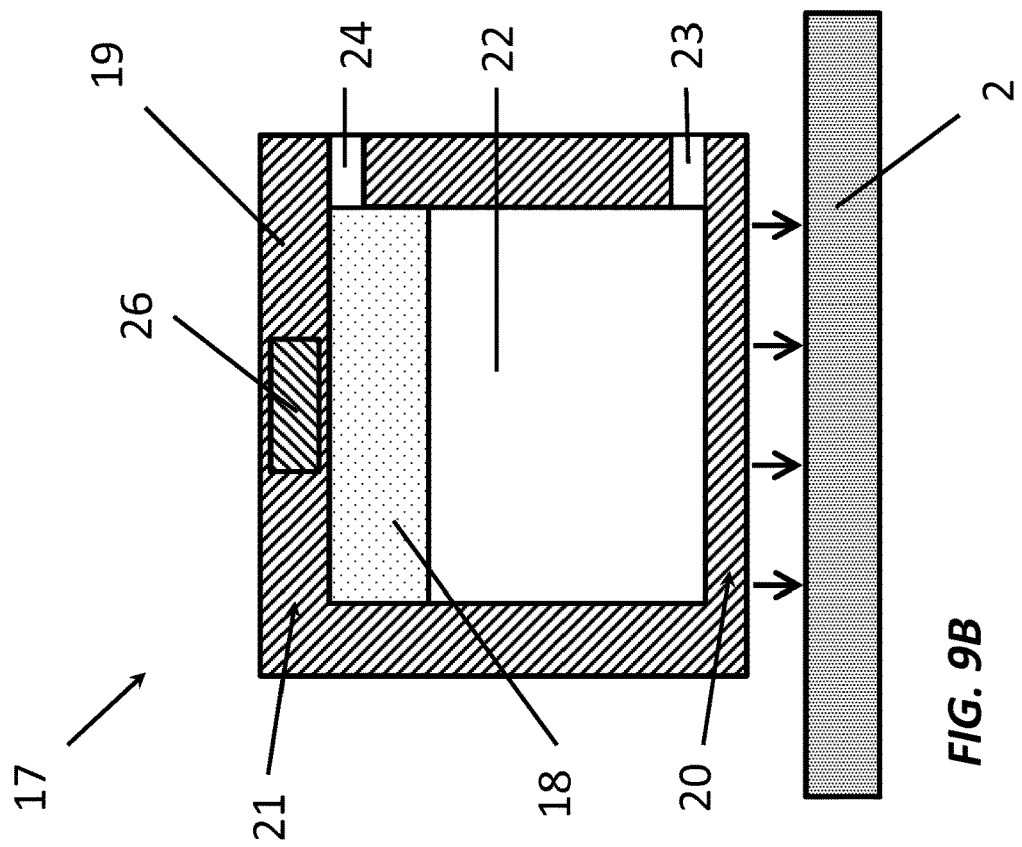
FIG. 9A shows a schematic representation of the magnet gripper of the mould device of FIG. 1 in a first position for attaching to a mould part near the magnet gripper.

If the permanent magnet 18 is located in the first position, such as shown in FIG. 9A, then the permanent magnet 18 strongly attracts a mould part 2, 3, 4 which is contacting, or at least located nearby, the magnet gripper 17 at the first side 20 of the body 19, such that magnet gripper 17 attaches to the mould part 2, 3, 4.

Figure 9B:
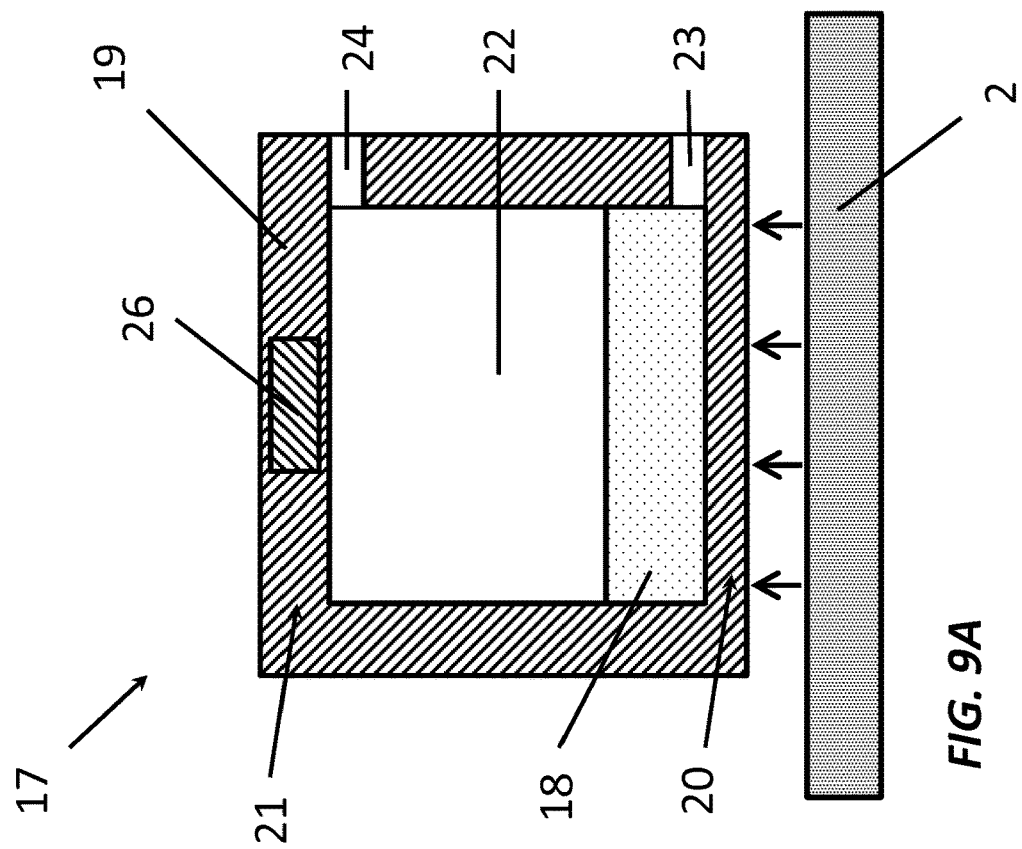
FIG. 9B shows a schematic representation of the magnet gripper of the mould device of FIG. 1 in a second position for releasing a mould part from the magnet gripper.

If the permanent magnet 18 is located in the second position, such as shown in FIG. 9B, then the magnetic attraction between the permanent magnet 18 and a mould part 2, 3, 4 which is contacting, or at least located nearby, the magnet gripper 17 at the first side 20 of the body 19, is no longer sufficient to attach the magnet gripper 17 to the mould part 2, 3, 4, such that the mould part 2, 3, 4 is released from the magnet gripper 17.

The permanent magnet 18 is moveable in the cavity 22 by means of compressed air which is introduced in the cavity 22 via a first inlet 23 through the body 19 near the first side 20 of the body 19 or via a second inlet 24 through the body 19 near the second side 21 of the body 19. When the permanent magnet 18 is located in the first position, then the injection of compressed air through the first inlet 23, moves the permanent magnet 18 to the second position. When the permanent magnet 18 is in the second position, then the injection of compressed air through the second inlet 24 moves the permanent magnet 18 to the first position.

When the permanent magnet 18 is in the first position and the magnet gripper 17 is contacting a mould part 2, 3, 4, then the permanent magnet 18 remains in the first position because of the magnetic attraction between the permanent magnet 18 and the mould part 2, 3, 4.

When the permanent magnet 18 is in the second position, then the permanent magnet 18 is held in the second position by means of the magnetic attraction between the permanent magnet 18 and a magnetically attractive material 25 arranged in the body 19 of the magnet gripper 17 at the second side 21 of the body 19.

Figure 10:
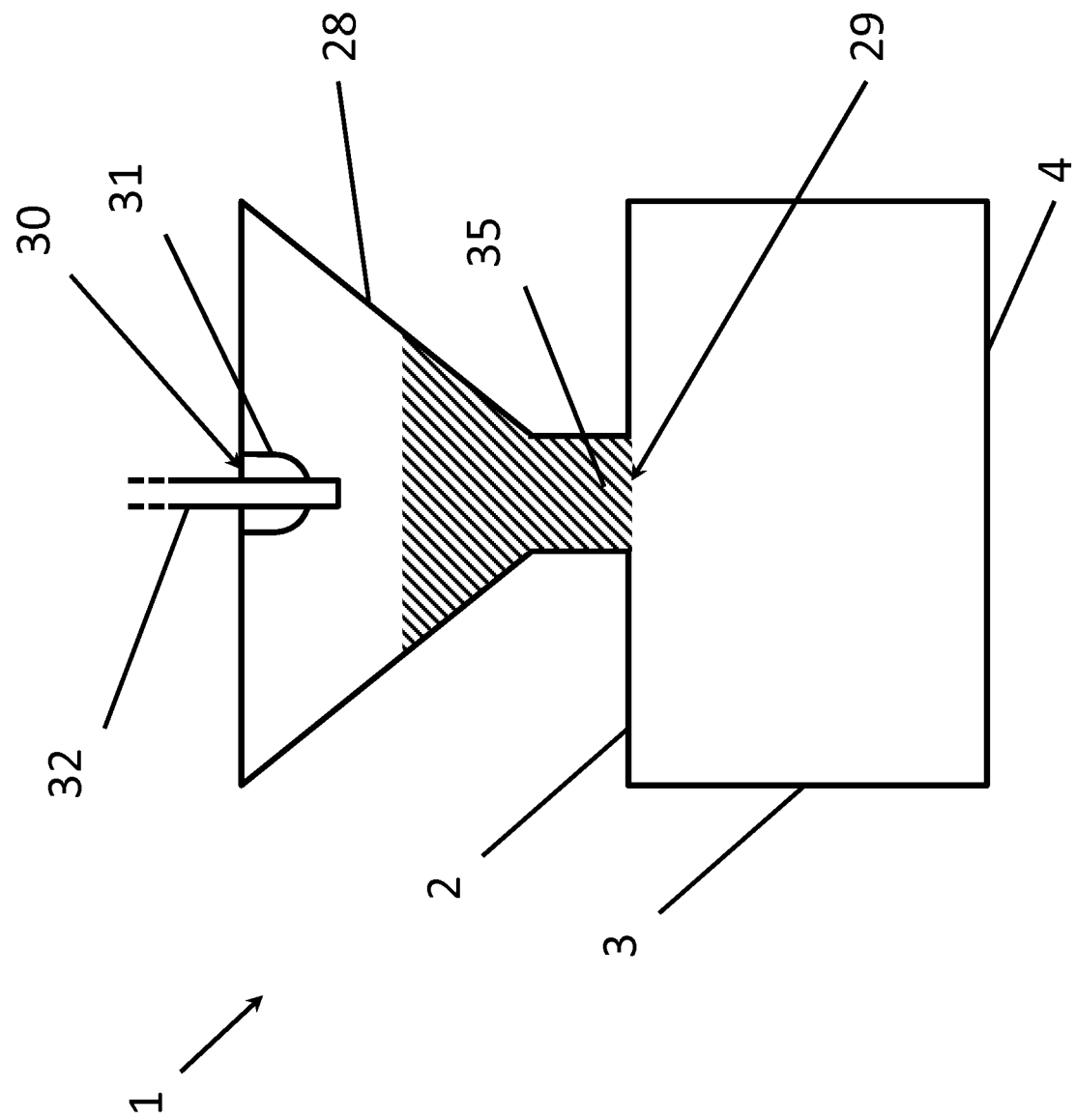
FIG. 10 shows an embodiment of the mould device according to an embodiment of the present invention provided with a feeding container.

In a third aspect of the present invention, which may be combined with the first aspect and/or the second aspect described herein, though not necessarily, the mould device 1 may be provided with a feeding system for introducing a curable raw material 35 into the mould cavity 5, such as shown in FIG. 10. The feeding system comprises a feeding container 28, which is provided for being connected to the mould formed by the mould parts 2, 3, 4 during the process of rotational moulding. The feeding container 28 has an open connection opening 29 towards the mould cavity 5. In this configuration, a curable raw material 35 present in the feeding container 28 is then introduced into the mould cavity 5 by means of gravity when the mould device 1 is being oriented by means of the robot arm 34 in such a way that the feeding container 28 is located above the mould cavity 5.

The feeding container 28 itself may be provided with a curable raw material 35 via a feeding tube 32 which is arranged through an inlet opening 30 of the feeding container 28. The inlet opening 30 is provided with a flexible membrane 31 which allows for an easy insertion of the feeding tube 32 through the inlet opening 30, but prevents the curable raw material 35 inside the feeding container 28 from exiting the feeding container 28 through the inlet opening 30.

The rotational moulding device 33 according to an embodiment of the present invention may be provided in such a way that the mould device 1 is moveable by the robot arm 34 between two or more of the following positions: a position for filling the mould cavity 5 or a feeding container 28 provided on the mould device 1, a position for heating the mould device 1, a position for forming the object wherein the mould device 1 rotates around one or more axes and/or is tilted, a position for cooling the mould device 1, a position for demoulding the object. Two or more of the previously mentioned positions may coincide. For example, the heating position and the position for forming the object may coincide. In the position for cooling, the mould device 1 may be tilted by means of the robot arm 34.

Further possible embodiments of the rotational moulding device 33 according to the present invention are described in WO2013164765A2, which is incorporated herein as a whole by reference.

| | References |
|---|---|
| 1 | mould device |
| 2 | first mould part |
| 3 | second mould part |
| 4 | third mould part |
| 5 | mould cavity |
| 6 | interior face |
| 7 | exterior face |
| 8 | first groove |
| 9 | second groove |
| 10 | protrusion |
| 11 | flange |
| 12 | heating resistance wire |
| 13 | outer sheath |
| 14 | copper tube |
| 15 | flexible tubing |
| 16 | covering element |
| 17 | magnet gripper |
| 18 | permanent magnet |
| 19 | body |
| 20 | first side |
| 21 | second side |
| 22 | cavity |
| 23 | first inlet |
| 24 | second inlet |
| 25 | magnetically attractive material |
| 26 | bolt |
| 27 | connector part |
| 28 | feeding container |
| 29 | connection opening |
| 30 | inlet opening |
| 31 | flexible membrane |
| 32 | feeding tube |
| 33 | rotational moulding device |
| 34 | robot arm |
| 35 | curable raw material |

The invention claimed is:

1. A mold device configured for use in a rotational molding device configured to perform a rotational molding process by rotating the mold device with a robot arm, the mold device comprising:
a connector part for connecting the mold device to the robot arm of the rotational molding device;
at least a first mold part and a second mold part comprising thermally conductive material and configured to assemble to each other and enclose a mold cavity in an assembled state, each of the first and second mold parts comprising an interior face facing towards the mold cavity and an exterior face facing away from the mold cavity;
attachment means for releasably attaching the first and second mold parts to each other;
heating elements arranged in first grooves positioned in the exterior face of at least one of the first and second mold parts, the heating elements configured to heat the respective mold part; and
cooling elements arranged in second grooves positioned in the exterior face of the at least one of the first and second mold parts in between the first grooves, the cooling elements configured to cool the respective mold part.

2. The mold device of claim 1, wherein the heating elements comprise at least one heating resistance wire.

3. The mold device of claim 2, wherein the heating elements further comprise an outer sheath of a woven thermally conductive material surrounding the at least one heating resistance wire.

4. The mold device of claim 1, wherein the cooling elements comprise a tube for circulating a cooling fluid.

5. The mold device of claim 1, wherein the first grooves have a U-shape in cross section and the heating elements arranged therein have a D-shape in cross section, or wherein the second grooves have a U-shape in cross section and the cooling elements arranged therein have a D-shape in cross section.

6. The mold device of claim 5, wherein the first grooves have a U-shape in cross section and the heating elements arranged therein have a D-shape in cross section, and wherein the second grooves have a U-shape in cross section and the cooling elements arranged therein have a D-shape in cross section.

7. The mold device of claim 1, wherein the first grooves and the second grooves have substantially the same cross section.

8. The mold device of claim 1, wherein one or more of the heating elements and the cooling elements are arranged at a predetermined depth within the first and second grooves, respectively.

9. The mold device of claim 1, wherein the mold device further comprises at least one covering element for closing off at least one of the first grooves and the second grooves.

10. The mold device of claim 1, wherein one or more of the first grooves and the second grooves are formed by recesses in the exterior face of the respective mold part.

11. The mold device of claim 1, wherein one or more of the first grooves and the second grooves are provided in protrusions on the exterior face of the respective mold part.

12. The mold device of claim 1, wherein at least one of the first grooves is located near the thickest part of the respective mold part.

13. The mold device of claim 1, wherein the first grooves and the second grooves are arranged alternatingly on the exterior face of the respective mold part.

14. The mold device of claim 1, wherein the first grooves and the second grooves are arranged equidistantly on the exterior face of the respective mold part.

15. The mold device of claim 1, wherein all of the heating elements are connected to a single first connection interface configured to releasably connect to a supply means of a resource required in the process of heating the respective mold part.

16. The mold device of claim 15, wherein the first connection interface is integrated in the connector part for connecting the mold device to the robot arm of the rotational molding device.

17. The mold device of claim 1, wherein all of the cooling elements are connected to a single second connection interface configured to releasably connect to a supply means of a resource required in the process of cooling the respective mold part.

18. The mold device of claim 15, wherein all of the cooling elements are connected to a single second connection interface configured to releasably connect to a supply means of a resource required in the process of cooling the respective mold part, and wherein the second connection interface is arranged opposite of the first connection interface.

19. The mold device of claim 1, wherein the attachment means comprise at least one magnet gripper arranged on one of the mold parts, the at least one magnet gripper comprising a permanent magnet which is moveably arranged in a cavity of the at least one magnet gripper, wherein the permanent magnet is moveable in the cavity of the at least one magnet gripper by means of compressed air between a first position for attaching to the other of the mold parts contacting the at least one magnet gripper, and a second position for releasing the other of the mold parts contacting the at least one magnet gripper.

20. A rotational molding device comprising:
   a mold device according to claim 1; and
   a robot arm configured to rotate the mold device during a rotational molding process.

\* \* \* \* \*